United States Patent

Kim

[11] Patent Number: 5,708,685
[45] Date of Patent: Jan. 13, 1998

[54] FRAME SYNCHRONOUS SIGNAL DETECTOR

[75] Inventor: Yeung-Hoi Kim, Seoul, Rep. of Korea

[73] Assignee: Samsung Electronics Co., Ltd., Kyungki-do, Rep. of Korea

[21] Appl. No.: 729,376

[22] Filed: Oct. 17, 1996

[30] Foreign Application Priority Data

Oct. 25, 1995 [KR] Rep. of Korea ............. 95-37096

[51] Int. Cl.[6] ........................................... H04L 7/00
[52] U.S. Cl. ..................... 375/365; 375/368; 370/509; 370/520
[58] Field of Search ........................... 375/365, 366, 375/368, 359; 370/509, 510, 511, 512, 513, 514, 520

[56] References Cited

U.S. PATENT DOCUMENTS 5,058,141  10/1991  Kern et al. ..................... 370/514
5,303,270  4/1994  Fujii ............................. 375/368
5,313,500  5/1994  Rikiyama ...................... 375/368
5,490,147  2/1996  Kubo ............................ 375/368

*Primary Examiner*—Stephen Chin
*Assistant Examiner*—Hai H. Phan
*Attorney, Agent, or Firm*—Sughrue, Mion, Zinn, Macpeak & Seas, PLLC

[57] ABSTRACT

A device is disclosed for detecting a frame synchronous signal which has been applied to a communication system for indicating a starting point of transmitted data. The frame synchronous signal detector includes a parallel converter, a detector, and a buffer. The parallel converter sequentially divides parallel data into segments. The detector compares data of each of the segments with the data of the frame synchronous signal which has been mapped, and from this comparison, precisely detects the data of the frame synchronous signal even though data having an abnormal format is inputted.

10 Claims, 9 Drawing Sheets

FRAME SYNCHRONOUS SIGNAL DETECTOR

BACKGROUND OF THE INVENTION

A. Field of the Invention

The present invention relates to a frame synchronous signal detector, and more particularly, it relates to a device which can precisely detect a frame synchronous signal even though input data which has been changed from serial into parallel has an abnormal parallel data pattern for detecting a frame synchronous signal which shows a starting point of transmitted data.

B. Description of the Prior Art

A transmission system which transmits and receives data can detect significant information from data only when a starting point of the data is detected from a receiver. Accordingly, a frame synchronous signal which shows a starting point of data is transmitted to a transmitter.

Generally, in order to transmit a frame synchronous signal as described above, a new frame synchronous line which is tapped from a transmitting data line is often installed.

However, in this case, an additional line for a frame synchronization is required and errors can occur if the transmission times between the above-mentioned two lines are not synchronized with each other when transmitting data.

Accordingly, in a transmitter, a frame synchronous signal which indicates a starting point of significant data is inserted in the data and transmitted. And, in a receiver, the starting point of data is detected after the frame synchronous signal is detected. At this time, the frame synchronous signal must be a data pattern which is predetermined for the transmitter and the receiver.

According to an agreement of the International Telecommunication Union (ITU), in transmitting and receiving an SDH frame of a synchronous digital hierarchy (SDH), data of a frame synchronous signal have predetermined patterns as follows.

A1A1A1A2A2A2{A1: F6H (='11110110'), A2: 28 H (='00101000')}

Here, A1 and A2 including 8 bits indicate a number, and A1 and A2 are respectively F6 and 28 which are hexadecimal numbers.

A Synchronous Digital Hierarchy like the above has various transmission speeds (51 Mbps, 155 Mbps, 622 Mbps etc.), and data of a frame synchronous signal are differentiated according to the respective transmission speeds. The above example shows data of a frame synchronous signal when the transmission speed is 155 Mbps (STC-3C) among various transmission speeds of a digital hierarchy, and A1 and A2 respectively have one byte (8 bits).

In the prior method wherein a frame synchronous signal is detected from data which has been transmitted to a receiver, at least 6 bytes are stored among data which have been inputted in series. On the other hand, the moment when the above-mentioned input data and the predetermined frame synchronous signal pattern (A1A1A1A2A2A2) are synchronized with each other is perceived as a starting point of significant data.

Recently, a transmission speed of a synchronous digital hierarchy which has been most widely used in the world is 155 Mbps (STS-3C). However, it is not easy to produce a monolithic integrated circuit which can process data transmitted at the above-mentioned speed in series by utilizing the present semiconductor technology.

Accordingly, after data inputted at a speed of 155 Mbps in series have been changed into parallel, the data speed is decreased to about one eighth of the above-mentioned speed which allows the data to be processed in a monolithic integrated circuit.

FIG. 2 illustrates a normal format of a frame synchronous signal.

FIG. 3 illustrates an abnormal format of a frame synchronous signal.

The abnormal data format illustrated in FIG. 3 is produced during the process of changing data transmitted as serial data into parallel data. When data having an abnormal format like the above is inputted to a receiver, a precise frame synchronous signal is not detected because a value of a frame synchronous signal is different from a value at a receiver.

SUMMARY OF THE INVENTION

Accordingly, the object of the present invention is to provide a device which can exactly detect the data of the frame synchronous signal even though data with an abnormal format is inputted, by generating fifteen bits from two sequential bytes of input data and perceiving the timing point when eight bits from the generated fifteen bits are synchronized with the data of the frame synchronous signal which has been mapped.

To achieve the object and in accordance with the purpose of the invention, as embodied and broadly described herein, the frame synchronous signal detector comprises:

a parallel converter which sequentially receives parallel data of predetermined bits according to a clock, produces combination data of predetermined bits by combining the present parallel data and the previous clock parallel data whenever parallel data is inputted, and supplies the present combination data and the previous clock combination data as control data, and supplies combination data which has been delayed by a predetermined clock as middle data;

a detector which receives the present combination data and combination data which have been supplied from said parallel converter as control data, divides the above-mentioned respective combination data into predetermined units while increasing the above-mentioned respective combination data by one bit from the least significant bit with the units of the bits being synchronized with the units of the input bit from said parallel converter, compares the respective divided data with the value of the frame synchronous signal which has been mapped, and outputs a starting signal and a selection signal corresponding to the respective divided data which have been determined according to the comparison result; and a buffer which divides the middle data supplied from the above-mentioned parallel converter using a division pattern like the division pattern of the above-mentioned detector and receives the divided data, receives a selection signal from the above-mentioned detector corresponding to the respective divided data of the middle data, and outputs the divided data corresponding to the selection signal of a high level.

According to another aspect of the present invention, parallel data is inputted to a parallel converter after being synchronized with a clock, and combination data is outputted after the present parallel data and the previous clock parallel data are combined by the parallel converter.

This combination data is supplied to a detection part as control data to determine whether the divided data is synchronized with the value of the frame synchronous signal, and is supplied to a buffer part after being delayed for a predetermined clock due to the delayed time at the detection part.

At this time, control data is inputted to the above-mentioned detection part and buffer part while being increased by one bit from the least significant bit (LSB) with the same units as the units of the input bits of the above-mentioned parallel converter, and divided.

In the above-mentioned detection part, respective data which have been divided by predetermined bits are compared with the value of the frame synchronous signal which has been mapped, and a starting signal and a selection signal which correspond to respective divided data according to the comparison result are generated. If certain divided data is synchronized with the value of the frame synchronous signal, a starting signal and a Selection signal of a high level are generated.

The starting signal generated like this is supplied to the outside, and the selection signal is inputted to the buffer part.

The divided data corresponding to the inputted selection signal of a high level is inputted from the above-mentioned buffer part.

As a result, because the two inputted parallel data comprise normal bits even though the inputted parallel data have an abnormal format, the frame synchronous signal can be exactly detected by dividing the combination data like the above and comparing the divided data with the value of the frame synchronous signal.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings illustrate one embodiment of the invention and, together with the description, serve to explain the principles of the invention.

In the drawings.

DETAILED DESCRIPTION OF THE PREFERRED EMBODIMENT

Reference will now be made in detail to a preferred embodiment of the present invention, an example of which is illustrated in the accompanying drawings.

First, with reference to FIG. 1 and FIG. 4, a principle of the present invention will be explained.

Figure 1:
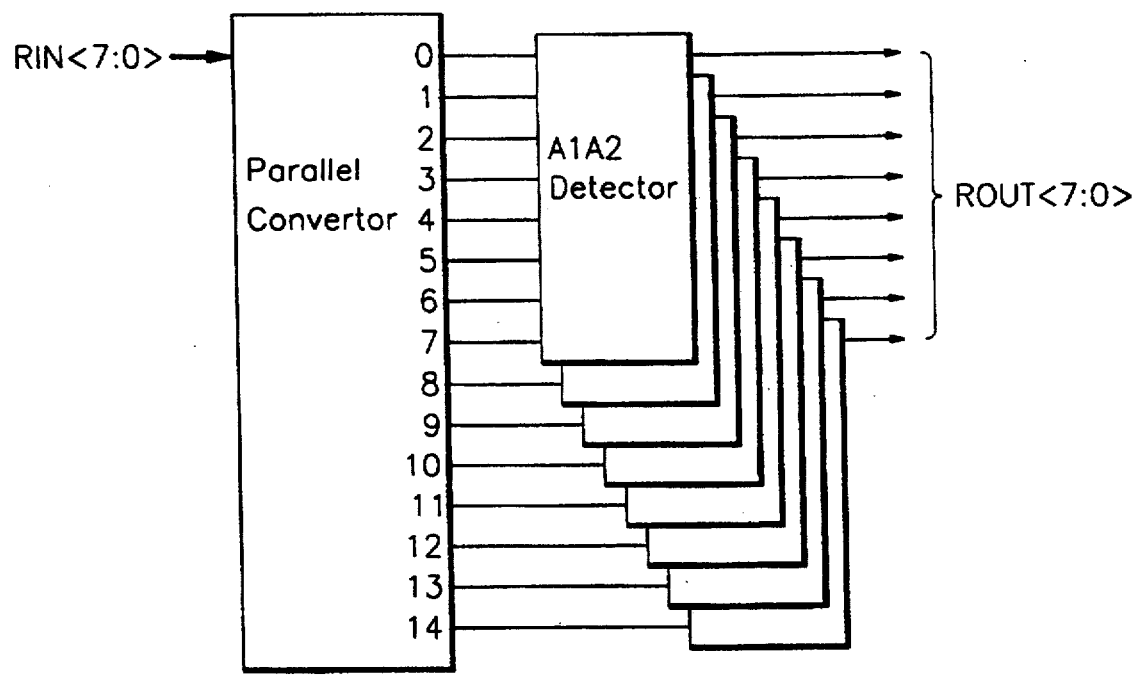
FIG. 1 is a block diagram of a conceptual structure of a frame synchronous signal detector.
Figure 2:
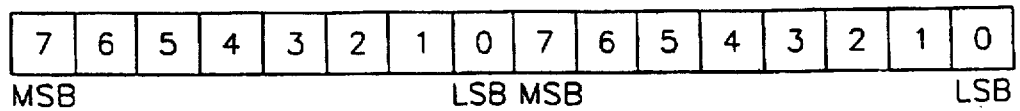
FIG. 2 is a drawing showing a normal data format of a frame synchronous signal.
Figure 3:
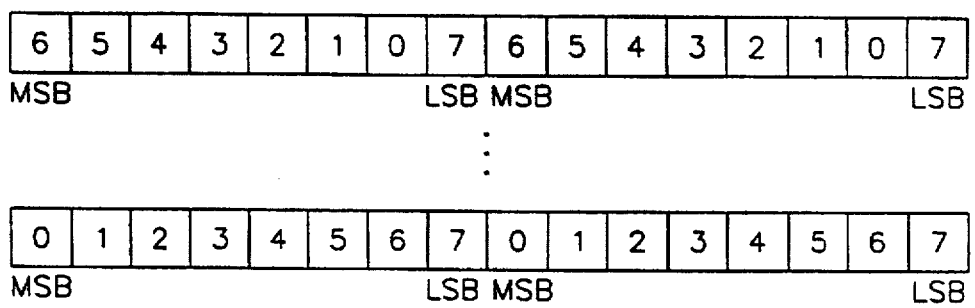
FIG. 3 is a drawing showing an abnormal data format of a frame synchronous signal.

In FIG. 1, parallel data (RIN<7:0>) of 8 bits are inputted to a parallel convertor per clock, and combination data of 15 bits in which the present parallel data (RIN<7:0>) and the previous clock parallel data have been combined are produced by a parallel converter. FIG. 4 shows a principle in which combination data like the above is produced.

The combination data which has been combined by the above-mentioned parallel converter is inputted to the A1A2 detector, and the frame synchronous signal value and the combination data which have been routed through the hardware are compared with each other at the A1A2 detector.

At this time, the combination data is divided into a unit of 8 bits while being continuously increased by one bit. And then, the above-mentioned data is inputted to the A1A2 detector. For example, if combination data of 15 bits is <14:0>, respective divided data are <7:0>, <8:1>, <9:2>, ... , <13:6>, <14:7>.

The respective data divided as described above are compared with the frame synchronous signal at the A1A2 detector. And the divided data which are synchronized with the frame synchronous signal are supplied to the outside as output data (ROUT<7:0>).

Figure 4:
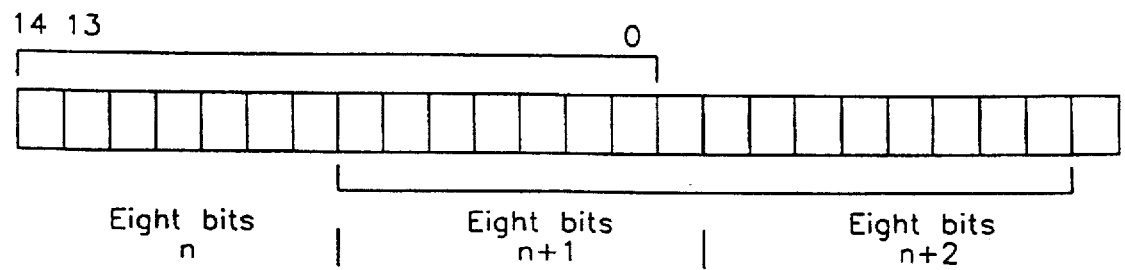
FIG. 4 is a drawing showing a data format which explains a principle of the present invention.

In FIG. 4, a data format explaining a principle that the combination data of 15 bits are generated by a parallel converter is illustrated.

According to the clock input, parallel data is inputted to a parallel converter with a unit of 8 bits from the left side of the data format of FIG. 4. Namely, if the 8 bit unit is inputted according to any clock, an 8 bit unit n+1 is inputted according to the next clock input and data of 8 bits are inputted according to the later sequential clock input.

If the data of the n+1 unit is inputted to the parallel converter, combination data of fifteen bits is generated. The above-mentioned combination data of fifteen bits consists of the seven most significant bits of data of the 8 bit n+1 unit from which the least significant bit has been deleted combined with the eight data bits of the 8 bit unit n.

Next, with reference to FIGS. 5–10, the frame synchronous signal detector in accordance with the preferred embodiment of the present invention will be explained.

Figure 5A:
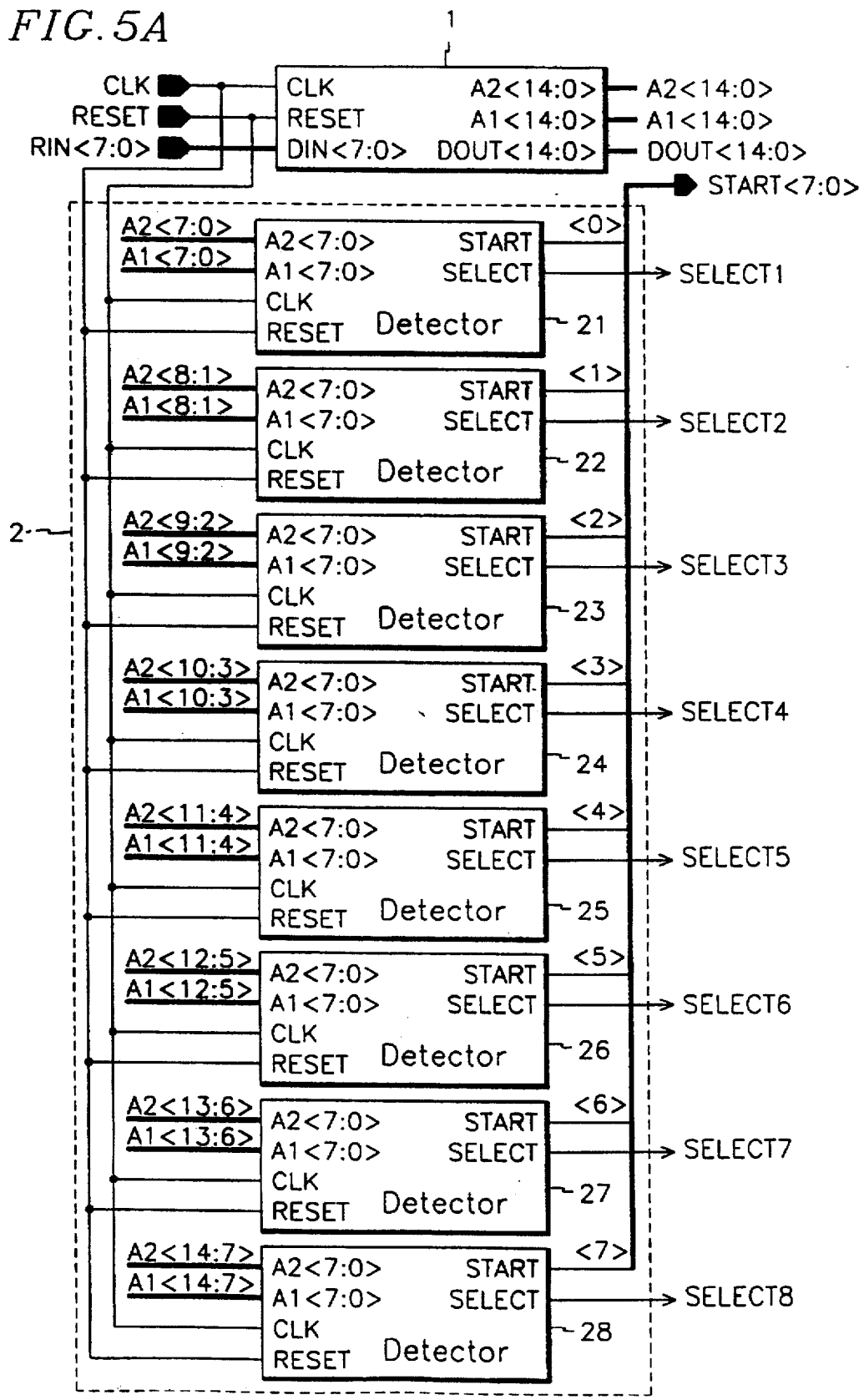
FIGS. 5A and 5B are block diagrams showing detailed structures of a frame synchronous signal detector in accordance with the preferred embodiment of the present invention.
Figure 5B:
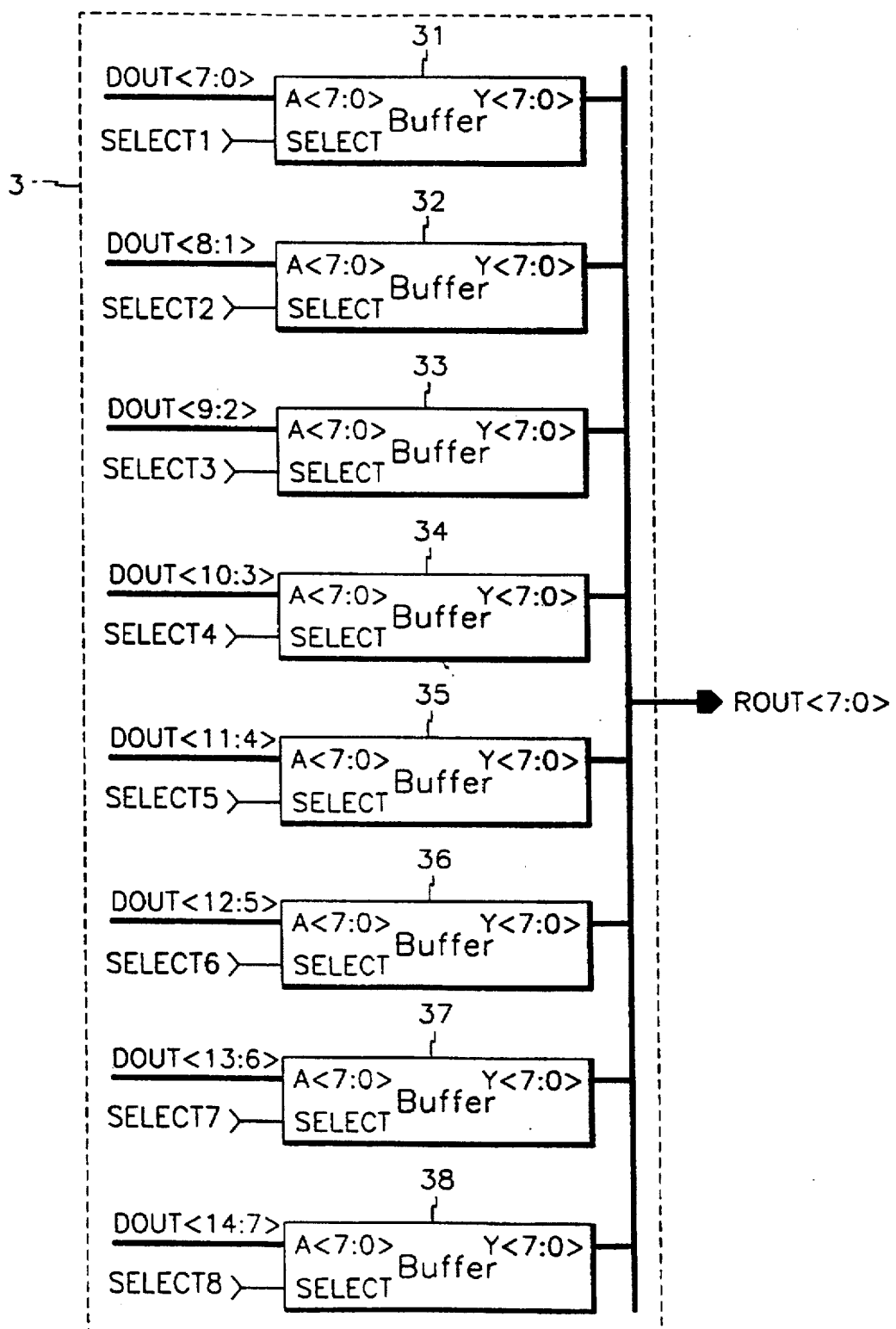

As illustrated in FIG. 5, the frame synchronous signal detector in accordance with the preferred embodiment of the present invention, includes:

a parallel converter 1 which receives a clock signal (CLK), a reset signal (RESET), and parallel data of 8 bits (RIN<7:0>) and outputs a first combination data of 15 bits (A1<14:0>), a second combination data (A2<14:0>), and middle data (DOUT<14:0>);

a detection part 2 which receives the above-mentioned first combination data (A1<14:0>) and second combination data (A2<14:0>), the clock signal (CLK) and reset signal (RESET) which have been inputted to the above-mentioned parallel converter 1, and outputs a starting signal (START) and the selection signal of 8 bits; and a buffer part 3 which receives the middle data (DOUT<14:0>) of the above-mentioned parallel converter 1 and the selection data of 8 bits, and outputs output data of 8 bits (ROUT<7:0>).

The above-mentioned detection part 2 comprises 8 detectors 21–28. Respective detectors 21–28 output a starting signal (START) and a selection signal (SELECT) of 1 bit after receiving 8 bits which have been divided from a first combination data (A1<14:0>) and a second combination data (A2<14:0>), and the clock signal (CLK) and the reset signal (RESET) which have been inputted to the above-mentioned parallel converter 1.

The above-mentioned buffer part 3 comprises 8 buffers 31–38. Respective buffers 31–38 output data of 8 bits after receiving 8 bits which have been divided from the middle data (DOUT<14:0>) outputted from the parallel converter 1 and the selection signal (SELECT) outputted from the respective detectors 21–28.

Figure 6:
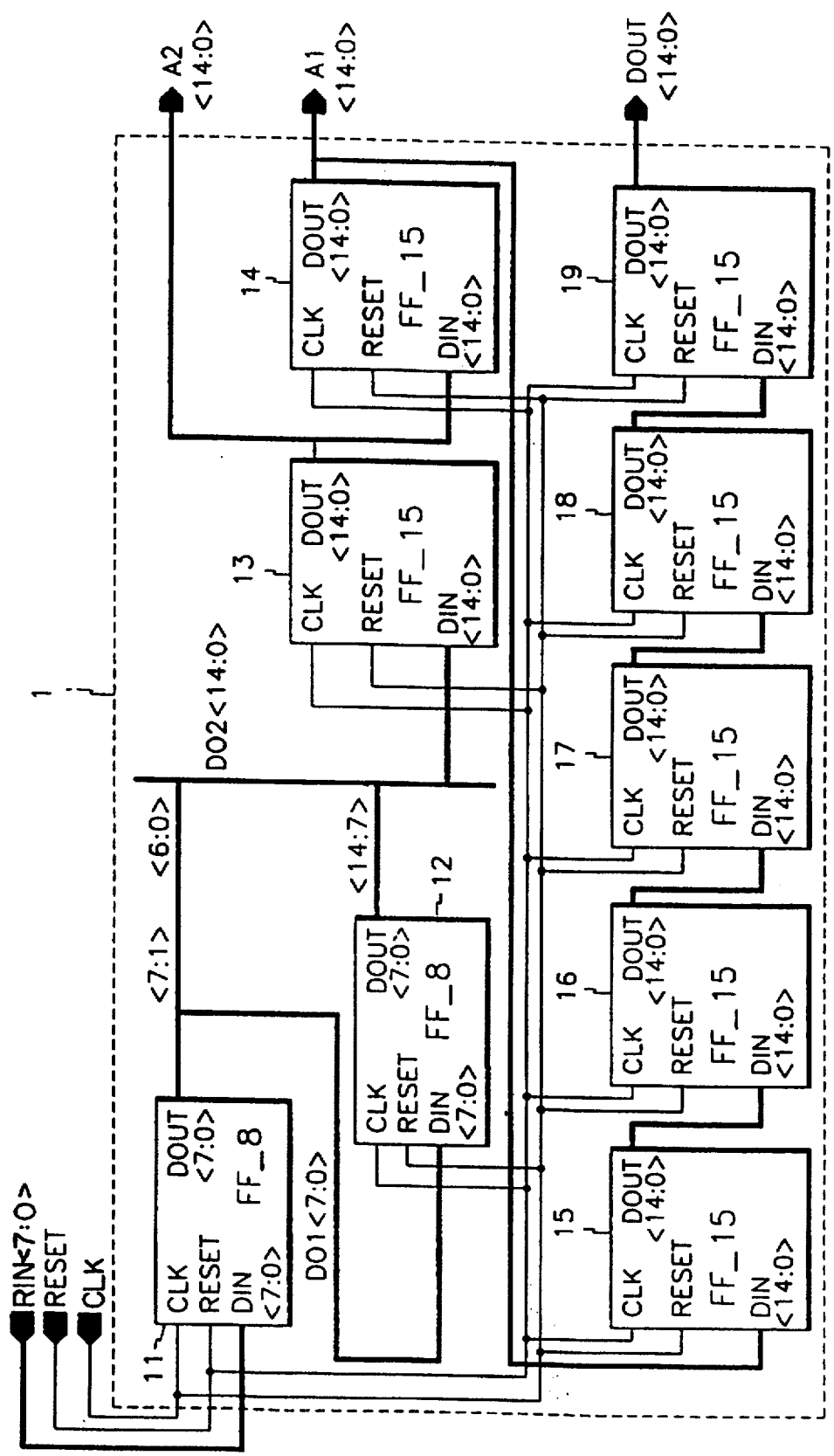
FIG. 6 is a detailed schematic diagram of a parallel converter illustrated in FIG. 5.

FIG. 6 illustrates a detailed structure of a parallel converter 1 of the above-mentioned FIG. 5.

As illustrated in FIG. 6, the parallel converter 1 of the frame synchronous signal detector in accordance with the preferred embodiment of the present invention, includes:

an 8-flip-flop part 11 which receives the parallel data of eight bits (RIN<7:0>) and outputs the data of eight bits;

an 8-flip-flop part 12 which receives the data of eight bits outputted from the above-mentioned 8-flip-flop part 11 and outputs the data of eight bits;

a 15-flip-flop part 13 which outputs the data of fifteen bits as a second combination data (A2<14:0>) after receiving the data of fifteen bits (DO2<14:0>) which includes the most significant seven bits of the output data of eight bits of the above-mentioned 8-flip-flop part 11 as seven bits of a lower rank and the eight bits of the above-mentioned 8-flip-flop part 12 as eight bits of a higher rank;

a 15-flip-flop part 14 which receives output data of the above-mentioned 15-flip-flop part 13 and outputs the data of fifteen bits as a first combination data (A1<14:0>); and five 15-flip-flop parts 15–19 connected to the output terminal of the above-mentioned 15-flip-flop part 14.

In the above-mentioned parallel converter 1 in accordance with the preferred embodiment of the present invention, the 8-flip-flop parts 11, 12 have eight flip-flops which have been connected in parallel, and the 15-flip-flop parts 13–19 have fifteen flip-flops which have been connected in parallel.

On the other hand, the clock signal (CLK) and the reset signal (RESET) are commonly connected to the respective parts of the parallel converter 1.

The above-mentioned 8-flip-flop parts 11, 12 delays the input data of eight bits for one clock and output the input data, and the above-mentioned 15-flip-flop parts 13–19 delays the input data of 15 bits for one clock and output the input data.

If an operation of a circuit starts after a power source has been connected, the parallel data of eight bits (RIN<7:0>) are inputted to the 8-flip-flop part 11 per each clock of the clock signal (CLK). In the 8-flip-flop part 11, the input data is transmitted to the output terminal per each clock input, and the output data of eight bits of the 8-flip-flop part 11 is transmitted to the input terminal of the 8-flip-flop part 12. In addition, the data of seven bits<7:1>, in which the least significant bit among the output data of eight bits has been deleted, is transmitted to the input terminal of the 15-flip-flop part 13 as seven bits<6:0> of a lower rank.

In the 8-flip-flop part 12, the input data of the 8-flip-flop part 11 which has been inputted to the input terminal of the 8-flip-flop part 12 is transmitted to the output terminal of the 8-flip-flop part 12 per clock input, and the output data of eight bits of the 8-flip-flop part 12 is transmitted to the input terminal of the 15-flip-flop part 13 as eight bits<14:7> of a lower rank.

In the 15-flip-flop part 13, the data (DO2<14:0>) of fifteen bits which has been transmitted to the input terminal of the 15-flip-flop part 13 is transmitted to the output terminal of the 15-flip-flop part 13 per clock input, and the output data of the 15-flip-flop part 13 are transmitted not only to the input terminal of the 15-flip-flop part 14 but also to the detection part 2 as second combination data (A2<14:0>).

In the 15-flip-flop part 14, the data (DO2<14:0>) which has been transmitted from the 15-flip-flop part 13 is transmitted to the output terminal of the part 14 per clock input, and the output data of the 15-flip-flop part 14 are transmitted not only to the input terminal of the 15-flip-flop part 15 but also to the detection part 2 as a first combination data (A1<14:0>).

The data transmitted to the input terminal of the 15-flip-flop part 15 is transmitted to the 15-flip-flop part of the next terminal whenever a clock is inputted, and the data produced at the output terminal of the last 15-flip-flop part 19 is five clocks ahead of the data transmitted to the input terminal of the 15-flip-flop part 15. The output data of the above-mentioned 15-flip-flop part 15 is supplied to the buffer part 3 as middle data (DOUT<14:0>).

The time when the data outputted from the 15-flip-flop part 14 is processed at the detection part 2 is considered in delaying the output data of the 15-flip-flop part 14 by five 15-flip-flop parts 15–19. Namely, the output data of the 15-flip-flop part 14 is delayed by five 15-flip-flop parts 15–19 while being processed at the detection part 2, and when the selection signal (SELECT) is outputted to the buffer part 3 from the above-mentioned detection part 2, the data corresponding to this selection signal is inputted to the buffer part 3 from the 15-flip-flop part 19.

Next, with reference to FIG. 5 and FIG. 7, the detection part 2 will be explained.

A first combination data (A1<14:0>) and a second combination data (A2<14:0>) which have been outputted from the parallel converter 1 are supplied to the detection part 2 as control data. In the detection part 2, the above-mentioned first combination data (A1<14:0>) and second combination data (A2<14:0>) are respectively divided into eight bits, and are respectively inputted to the eight detectors 21–28. The table of the bits inputted to the respective detectors 21–28 is as follows.

| Detector | Division Bit |
| --- | --- |
| 21 | A1<7:0>, A2<7:0> |
| 22 | A1<8:1>, A2<8:1> |
| 23 | A1<9:2>, A2<9:2> |
| 24 | A1<10:3>, A2<10:3> |
| 25 | A1<11:4>, A2<11:4> |
| 26 | A1<12:5>, A2<12:5> |
| 27 | A1<13:6>, A2<13:6> |
| 28 | A1<14:7>, A2<14:7> |

Figure 7:
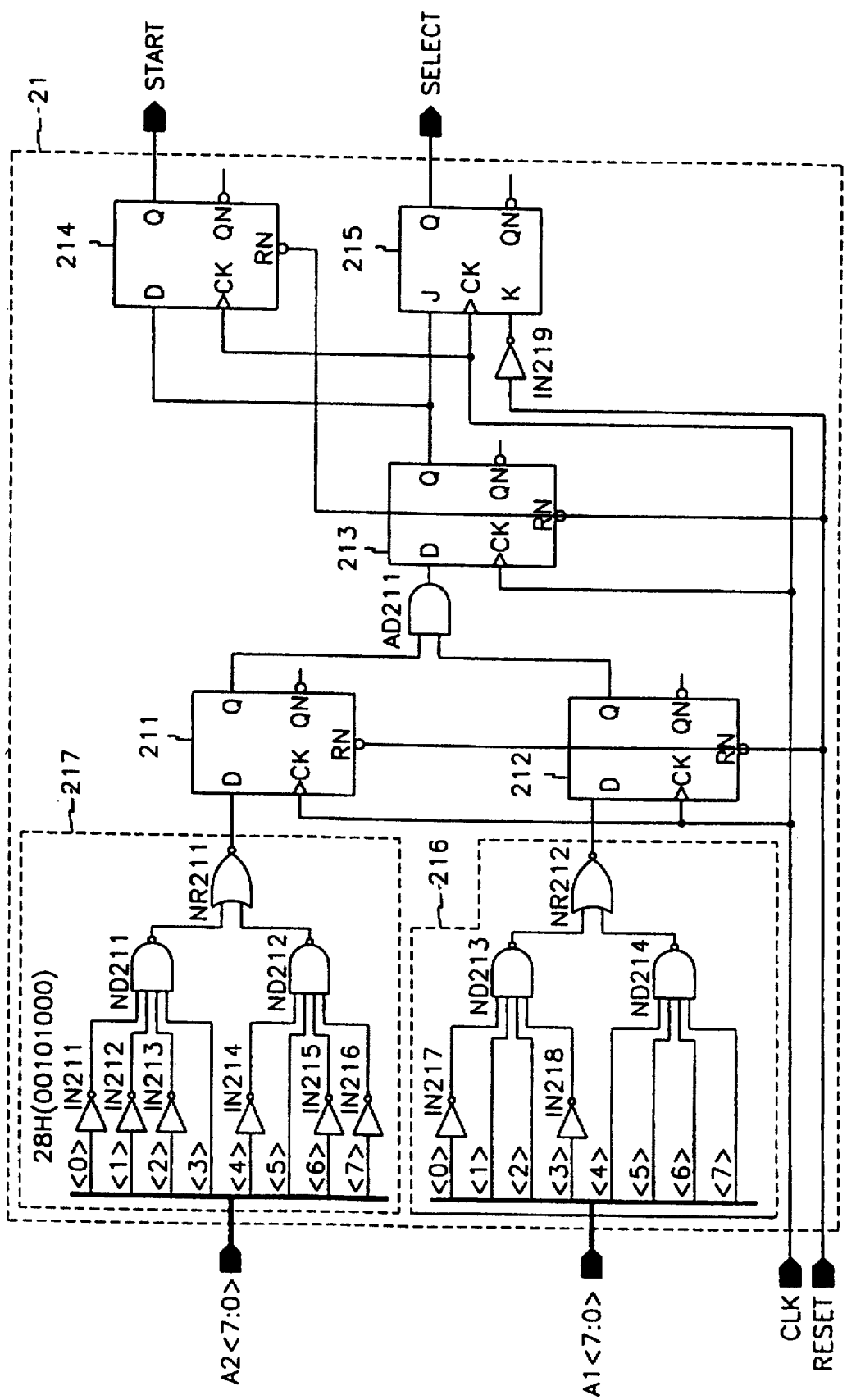
FIG. 7 is a detailed schematic diagram of a detector illustrated in FIG. 5.

Since the respective detectors 21–28 have the same inner structure, FIG. 7 depicts the schematic of detector 21. A first combination data (A1<7:0>) and a second combination data (A2<7:0>) are inputted to the detector 21.

The detector 21 comprises a first logic circuit 216, a second logic circuit 217, four D-type flip-flops 211–214, an AND-GATE (AD211), and a J-K flip-flop 215.

A first logic circuit 216 and a second logic circuit 217 detect whether the value of a frame synchronous signal and the inputted combination data are synchronized with each other, and output a high level signal only when the combination data inputted by a logic gate are specific values.

Namely, the output signal of a first logic circuit 216 is a high level only when a first combination data (A1<7:0>) is 11110110, and the output signal of a second logic circuit 217 is a high level only when a second combination data (A2<7:0>) is 00101000.

As mentioned above, the value mapped by a first logic circuit 216 and a second logic circuit 217 is the value of the frame synchronous signal which has commonly been used in a synchronous digital hierarchy. It is easy to change this mapping value by designing a different logic gate circuit.

The output signal of the respective logic circuits 216, 217 is inputted to an AND-GATE (AD211) and is multiplied logically after being delayed by the D-type flip-flop 211, 212 for one clock.

If a first combination data (A1<7:0>) and a second combination data (A2<7:0>) are all synchronized with the mapping values of the respective logic circuits 216 and 217, a high level signal is outputted from the respective logic circuits 216, 217. And the result of the logic multiplication by the AND-GATE (AD211) of these two outputs becomes a high level.

The high level output of the AND-GATE (AD211) is inputted to the D-type flip-flop 213 and the J-K flip-flop 215 after being delayed by the D-type flip-flop for one clock. In the D-type flip-flop 214, the input signal is outputted as a starting signal (START) after being delayed for one clock.

In the J-K flip-flop 215, if a high level signal is inputted to a J-input terminal, a high level input signal is supplied to the output terminal as a selection signal (SELECT).

At this time, the difference of the starting signal (START) and the selection signal (SELECT) outputted from the D-type flip-flop and the J-K flip-flop is that the starting signal (START) is a high level for one clock and the selection signal (SELECT) maintains a high level until the high level is inputted to the K-input terminal of the J-K flip-flop 215.

Accordingly, if one among the respective eight bits of a first combination data (A1<14:0>) and a second combination data (A2<14:0>) is synchronized with the value of the frame synchronous signal, the starting signal (START) which is a high level for one clock and the selection signal (SELECT) which is a high level for a certain amount of time are outputted from the corresponding detector.

The starting signals (START) of the respective detectors 21–28 are all summed up and supplied to the outside as the starting signal of eight bits (START<7:0>). And the selection signal (SELECT) is inputted to the corresponding buffer of a buffer part 3. Namely, eight detectors 21–28 and eight buffers 31–38 are connected face to face with one another.

Next, with reference to FIG. 5 and FIG. 8, a buffer part 3 will be explained.

The buffer part 3 comprises eight buffers, and eight bits among the selection signal (SELECT) outputted from respective detectors 21–28 and the middle data outputted from the parallel converter 1 are inputted to respective buffers 31–38.

As mentioned above, the middle data (DOUT<14:0>) outputted from the parallel converter 1 correspond to the selection signals (SELECT) inputted to the buffer part 3.

The above-mentioned middle data (DOUT<14:0>) are inputted by the respective buffers 31–38 after being divided into eight bits according to a division method which is the same as the division method of the input data of the detectors 21–28.

Figure 8:
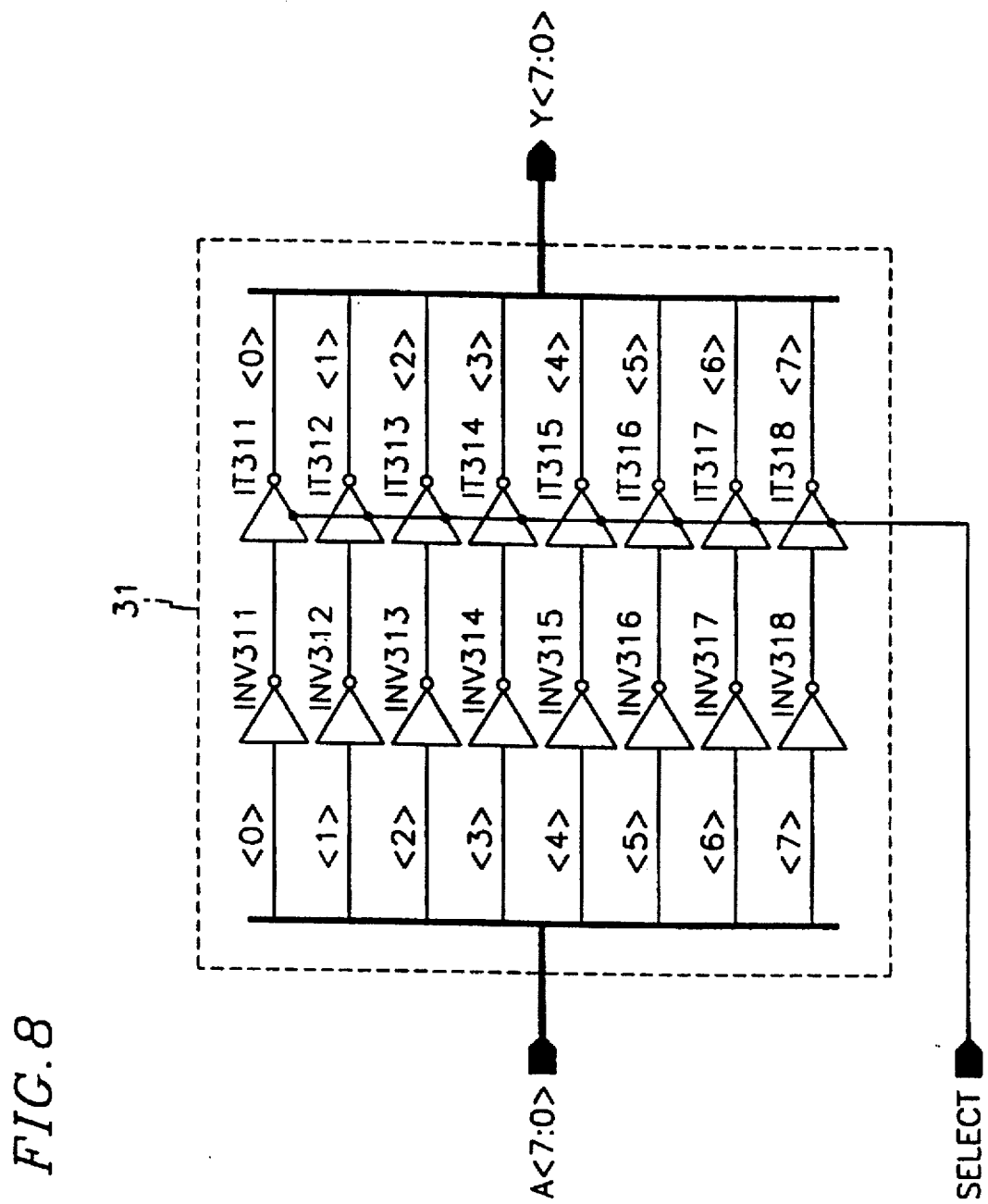
FIG. 8 is a detailed schematic diagram of a buffer as illustrated in FIG. 5.

Since the respective buffers 31–38 have the same inner structure, FIG. 8 illustrates the schematic of buffer 31.

As illustrated in FIG. 8, the buffer 31 comprises eight inverters (INV311–INV318) receiving the input data of eight bits, and eight transmission gates (IT311–IT318) which are connected to the output terminals of the respective inverters (INV311–INV318) and whose control terminals are connected to the selection signal (SELECT) in common.

The data of eight bits among the middle data (DOUT<14:0>) are inverted according to each bit after being inputted to eight inverters (INV311–INV318), and the outputs of the respective inverters (INV311–INV318) are inputted to eight transmission gates (IT311–IT318).

The selection signal (SELECT) is inputted to the control terminals of the respective transmission gates (IT311–IT318). When this selection signal (SELECT) is at a high level, the input data of the respective transmission gates (IT311–IT318) are transmitted to the output terminal after being inverted. And when the selection signal (SELECT) is at a low level, the input data of the respective transmission gates (IT311–IT318) are controlled and not transmitted to the output terminal.

Therefore, the data (Y<7:0>) outputted from the buffer 3 is the same as the value of the frame synchronous signal. And this data is supplied to the outside as the output data (ROUT<7:0>) of the frame synchronous signal detector.

Figure 9:
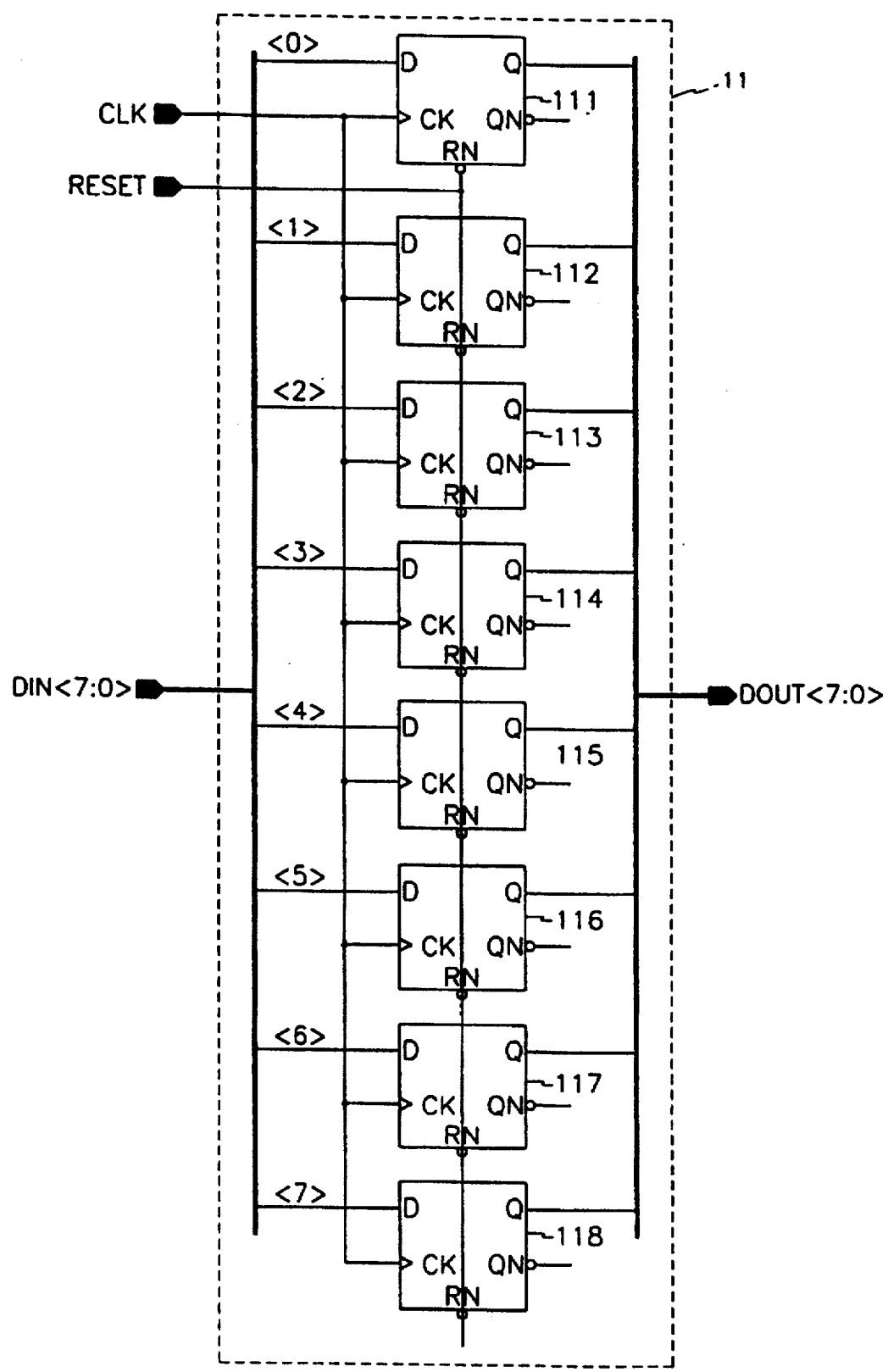
FIG. 9 is a detailed schematic diagram of an 8-flip-flop (FF_8) as illustrated in FIG. 6.
Figure 10:
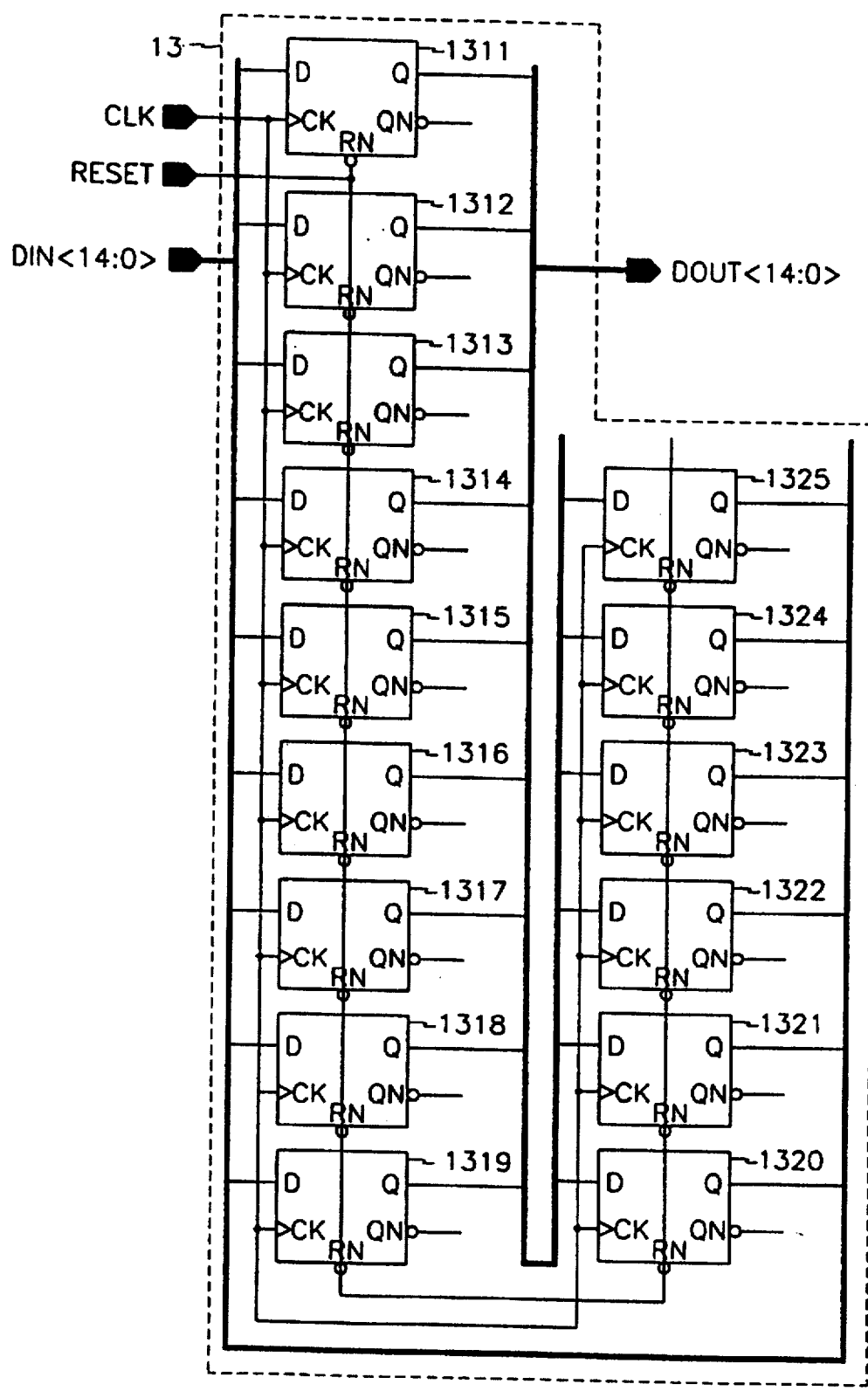
FIG. 10 is a detailed schematic diagram of a 15-flip-flop (FF_15) as illustrated in FIG. 6.

FIG. 9 and FIG. 10 illustrate the detailed structure of the 8-flip-flop part 11 and the 15-flip-flop part 13 applied to the parallel convertor 1 of FIG. 6.

As illustrated in FIG. 9, the 8-flip-flop part 11 which processes the input eight bits comprises eight D-type flip-flops 111–118 which transmit the bit data of the input terminal (D) to the output terminal (Q) according to the clock input.

One bit among the input of eight bits is inputted to the data input terminal (D) of the respective D-type flip-flops 111–118. The clock signal (CLK) is inputted to the clock terminals (CK) which are connected in parallel. The reset signal (RESET) is inputted to the reset terminals (RN) which are connected in parallel.

As illustrated in FIG. 10, the 15-flip-flop part 13 which processes the input fifteen bits comprises fifteen D-type flip-flops 1311–1325 which transmit the bit data of the input terminal (D) to the output terminal (Q) according to the clock input.

One bit among the inputs of fifteen bits is inputted to the data input terminal (D) of the respective D-flip-flops 1311–1325. The clock signal (CLK) is inputted to the clock terminals (CK) which are connected in parallel. The reset signal (RESET) is inputted to the reset terminals (RN) which are connected in parallel.

The technical field of the present invention is not limited to only forming the respective flip-flop parts with the D-type flip-flop as described above, and flip-flops of another pattern for performing a delay operation can be utilized.

In accordance with the preferred embodiment of the present invention described above, by generating fifteen bits from two sequential bytes of the input data and detecting the timing point when eight bits from the generated fifteen bits are synchronized with the data of the frame synchronous signal which has been mapped, a device which can exactly detect the data of the frame synchronous signal even though data having an abnormal format are inputted is possible.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A frame synchronous signal detector, comprising:

a parallel converter which sequentially receives units of parallel data according to a clock, each of said units of parallel data having a first predetermined number of bits, produces combination data by combining the units of parallel data associated with two consecutive pulses of the clock, wherein a first of the combination data produced by said parallel converter is associated with a present pulse of the clock and a next-previous pulse of the clock, a second of the combination data is associated with the next-previous pulse of the clock and a second-to-next-previous of the clock, and a third of the combination data is associated with two consecutive pulses of the clock situated a predetermined number of pulses of the clock previous to the present clock pulse, supplies the first of the combination and the second of the combination data as control data and supplies the third of the combination data as middle data;

a detector part which receives said first combination data and said second combination data which have been supplied from said parallel converter as the control data, respectively divides said first combination data and said second combination data into a first plurality of predetermined segments, each of the first plurality of predetermined segments being displaced by one bit, in a direction of a least significant bit of said combination data, from a next-previous one of the first plurality of predetermined segments, thereby producing respective divided combination data, compares the respective divided combination data with a value of a frame synchronous signal which has previously been mapped and produces a first comparison result, and outputs a starting signal and a selection signal corresponding to the respective divided combination data which has been determined according to the first comparison result; and a buffer which divides the middle data supplied from said parallel converter into a second plurality of predetermined segments, each of the second plurality of predetermined segments being displaced by one bit, in a direction of a least significant bit of said middle data, from a next-previous one of the second plurality of predetermined segments, thereby producing respective divided middle data, receives a selection signal of said detector corresponding to the respective divided data of the middle data, and outputs the divided data corresponding to the selection signal.

2. The frame synchronous signal detector as defined in claim 1, wherein said parallel converter comprises:

a first flip-flop part, having a first output terminal, which receives and transmits the parallel data to said first output terminal as first output data having eight bits;

a second flip-flop part, having a second output terminal, which receives and transmits the first output data of said first flip-flop part to said second output terminal as second output data having eight bits;

a third flip-flop part, having a third output terminal, which receives seven most significant bits of the first output data and the eight bits of the second output data and outputs from said third output terminal fifteen bit data with the seven most significant bits of the first output data as seven bits of a lower rank and the eight bits of said second flip-flop as eight bits of a higher rank;

a fourth flip-flop part, having a fourth output terminal, which receives and transmits the fifteen bit data output from said third output terminal to said fourth output terminal as said second of the combination data; and a fifth flip-flop part which receives said second of the combination data output from said fourth output terminal and supplies said second of the combination data after delaying said second of the combination data by said predetermined number of the pulses of the clock.

3. The frame synchronous signal detector as defined in claim 2, wherein each of said flip-flop parts transmits respective data whenever one of the pulses of the clock is produced.

4. The frame synchronous signal detector as defined in claim 2, wherein each of said flip-flop parts includes flip-flops having respective data input terminals parallel connected to receive corresponding bits of input data, and a signal of the clock signal and a reset signal are parallel connected to the respective flip-flops.

5. The frame synchronous signal detector as defined in claim 4, wherein each of said flip-flops is a D-type flip-flop.

6. The frame synchronous signal detector as defined in claim 1, wherein said detector part comprises a number of detectors, wherein said number of detectors is equal to said first plurality of predetermined segments.

7. The frame synchronous signal detector as defined in claim 6, wherein each of said detectors comprises:

a first logic circuit which receives one of said predetermined segments of said first combination data and compares said one of said predetermined segments of said first combination data with the value of the frame synchronous signal to produce a second comparison result and outputs a signal corresponding to the second comparison result;

a second logic circuit which receives one of said predetermined segments of said second combination data and compares said one of said predetermined segments of said second combination data with the value of the frame synchronous signal to produce a third comparison result and outputs a signal corresponding to the third comparison result;

a logic multiplication device which receives the signal corresponding to the second comparison result and the signal corresponding to the third comparison result, and performs a logic multiplication of the signal corresponding to the second comparison result and the signal corresponding to the third comparison result, thereby outputting a logical multiplication signal;

a first flip-flop which outputs the logical multiplication signal output by said multiplication device as a start signal after receiving the logical multiplication signal and delaying output of said logical multiplication signal by one of the clock pulses;

a second flip-flop which receives the logical multiplication signal output by said logic multiplication device and outputs a selection signal having a state equal to a state of the logical multiplication signal and maintains the state of the selection signal equal to the logic multiplication signal until a reset signal is inputted.

8. The frame synchronous signal detector as defined in claim 7, wherein said first flip-flop is a D-type flip-flop, and said second flip-flop is a J-K type flip-flop.

9. The frame synchronous signal detector as defined in claim 6, wherein said buffer part comprises a number of buffers, said number of buffers being equal to said second plurality of predetermined segments, the respective buffers receive one of said second plurality of the predetermined number of segments of the middle data, and the respective buffers are connected to receive the selection signal from the corresponding detector of said detection part.

10. The frame synchronous signal as defined in claim 9, wherein each of said respective buffers comprises:

a plurality of inverters, said plurality of inverters being equal in number to the first predetermined number of bits, each of said inverters receives and inverts a bit of input data of said one of said second plurality of the predetermined number of segments of the middle data; and a plurality of transmission gates, each of said transmission gates being connected to the output terminal of a respective one of said plurality of inverters, and inverting the output signal of said respective inverter, and transmits or controls the inverted signal according to the received selection signal.

* * * * *